United States Patent [19]

Tsutsumi

[11] Patent Number: 5,746,382
[45] Date of Patent: May 5, 1998

[54] FISHING SPINNING REEL WITH SPOOL HAVING TAPERED PORTION AND GUIDE

[75] Inventor: Wataru Tsutsumi, Tokyo, Japan

[73] Assignee: Daiwa Seiko, Inc., Tokyo, Japan

[21] Appl. No.: 821,411

[22] Filed: Mar. 21, 1997

Related U.S. Application Data

[63] Continuation of Ser. No. 510,618, Aug. 3, 1995, abandoned.

[30] Foreign Application Priority Data

Aug. 5, 1994 [JP] Japan ................... 6-010736 U

[51] Int. Cl.⁶ .................................................. A01K 89/01
[52] U.S. Cl. ........................................ 242/322; 242/613.1
[58] Field of Search ........................... 242/322, 231, 242/613.1

[56] References Cited

U.S. PATENT DOCUMENTS

| | | | |
|---|---|---|---|
| 1,179,309 | 4/1916 | Henshaw | 242/613.1 X |
| 1,408,463 | 3/1922 | Miles | 242/613.1 X |
| 1,555,544 | 9/1925 | Anthony | 242/613.1 X |
| 4,249,706 | 2/1981 | Haselbauer et al. | |
| 4,418,877 | 12/1983 | Nakajima | 242/322 |
| 5,195,699 | 3/1993 | Stinnette | 242/322 |

FOREIGN PATENT DOCUMENTS

| | | |
|---|---|---|
| 732316 | 10/1969 | Belgium . |
| 61-152269 | 9/1986 | Japan . |
| 61-160660 | 10/1986 | Japan . |
| 63-38769 | 3/1988 | Japan . |
| 3-27967 | 3/1991 | Japan . |
| 1185478 | 3/1970 | United Kingdom ......... 242/613.1 |

*Primary Examiner*—Daniel P. Stodola
*Assistant Examiner*—Emmanuel M. Marcelo
*Attorney, Agent, or Firm*—Sughrue, Mion, Zinn, Macpeak & Seas, PLLC

[57] ABSTRACT

A fishing spinning reel in which is so designed that the fishing line is prevented from being bound together when let out of the reel, whereby the fishing line is let out of the reel stably at all times. The spool (1) includes a tapered portion (4) which is gradually smaller in diameter towards the rear end, thus providing a fishing-line winding surface (2), and a guide (3) at the front end which, when the fishing line is let out of the reel, prevents the fishing line from touching a wound fishing-line surface (2a) formed by the fishing line wound on the spool.

9 Claims, 3 Drawing Sheets

FISHING SPINNING REEL WITH SPOOL HAVING TAPERED PORTION AND GUIDE

This is a Continuation of application Ser. No. 08/510,618, filed Aug. 3, 1995, now abandoned.

BACKGROUND OF THE INVENTION

This invention relates to a fishing spinning reel which is improved in line throwing characteristic.

A conventional spool for throwing a fishing line far, which is a part of a fishing spinning reel, is designed as follows: That is, as disclosed by Japanese Utility Patent Application (OPI) No's 152269/1986 and 38769/1988 (the term "OPI" as used herein means an "unexamined publication application"), the spool comprises a front flange, a fishing-line winding drum, and a rear flange. The fishing-line winding drum is tapered towards the front end of the spool shaft.

The above-described conventional spool involves the following problems: When the fishing rod is quickly swung down to throw the fishing line far, the fishing line wound near the rear flange is smoothly let out of the fishing reel. However, since the fishing line is spirally let out of the fishing reel, it strikes the front flange hard; that is, it is let out of the fishing reel while being resisted by the front flange. Especially the fishing line wound near the front flange suffers from this problem. In addition, since the fishing line must move over the front flange protruded outwardly, it rubs the latter so that a frictional resistance is applied to the fishing line. As a result, the fishing line cannot be thrown far; that is, the terminal hook device cannot be thrown to the intended destination point at which the angler has aimed.

On the other hand, when the fishing line is initially wound on the spool, it may slide forward, and when the fishing line is let out of the fishing reel, it may loosen and collapse. Those difficulties may be eliminated, for instance, by making the fishing-line winding surface of the spool rough to the extent that the fishing line is prevented from sliding on the surface.

In this connection, Japanese Utility Patent Application (OPI) No. 27967/1991 has disclosed a spool which is gradually smaller in diameter towards the rear end, so that the fishing line does not encounter resistance when let out of the fishing reel, such that it may be thrown far. It is true that the spool is advantageous in that the fishing line is let out of the fishing reel without resistance. However, it suffers from the following difficulty: When the fishing line is let out of the fishing reel, the fishing line wound on the front end portion of the spool collapses when it is touched by the fishing line coming from behind, which makes it impossible to let the fishing line out of the reel loop by loop. That is, with the spool, it is difficult to smoothly let the fishing line out of the fishing reel.

SUMMARY OF THE INVENTION

Accordingly, an object of the invention is to provide a fishing spinning reel which is so designed that the fishing line wound on the fishing line winding section is prevented from being unwound, and in addition is prevented from being bound together when let out of the reel; that is, the fishing line is stably let out of the reel at all times.

The foregoing object of the invention has been achieved by the provision of a fishing spinning reel in which a fishing line is wound on a spool which is moved back and forth in association with the rotation of a handle; in which, according to the invention, the spool comprises:

a tapered portion which is gradually smaller in diameter towards the rear end, thus providing a fishing-line winding surface; and a guide at the front end which, when the fishing line is let out of the reel, prevents the fishing line from touching a wound fishing-line surface which is provided by the fishing line wound on the spool.

In the spool of the fishing spinning reel, the tapered portion providing the fishing-line winding surface is gradually smaller in diameter towards the rear end. Also, the guide is formed at the front end thereof which, when the fishing line is let out of the reel, prevents the fishing line from touching the wound fishing-line surface. Hence, with the spool, the fishing line wound on the fishing-line winding surface is prevented from collapsing; that is, the fishing line is stably let out of the reel.

DETAILED DESCRIPTION OF THE PREFERRED EMBODIMENTS

Preferred embodiments of the invention will be described with reference to the accompanying drawings.

Figure 1:
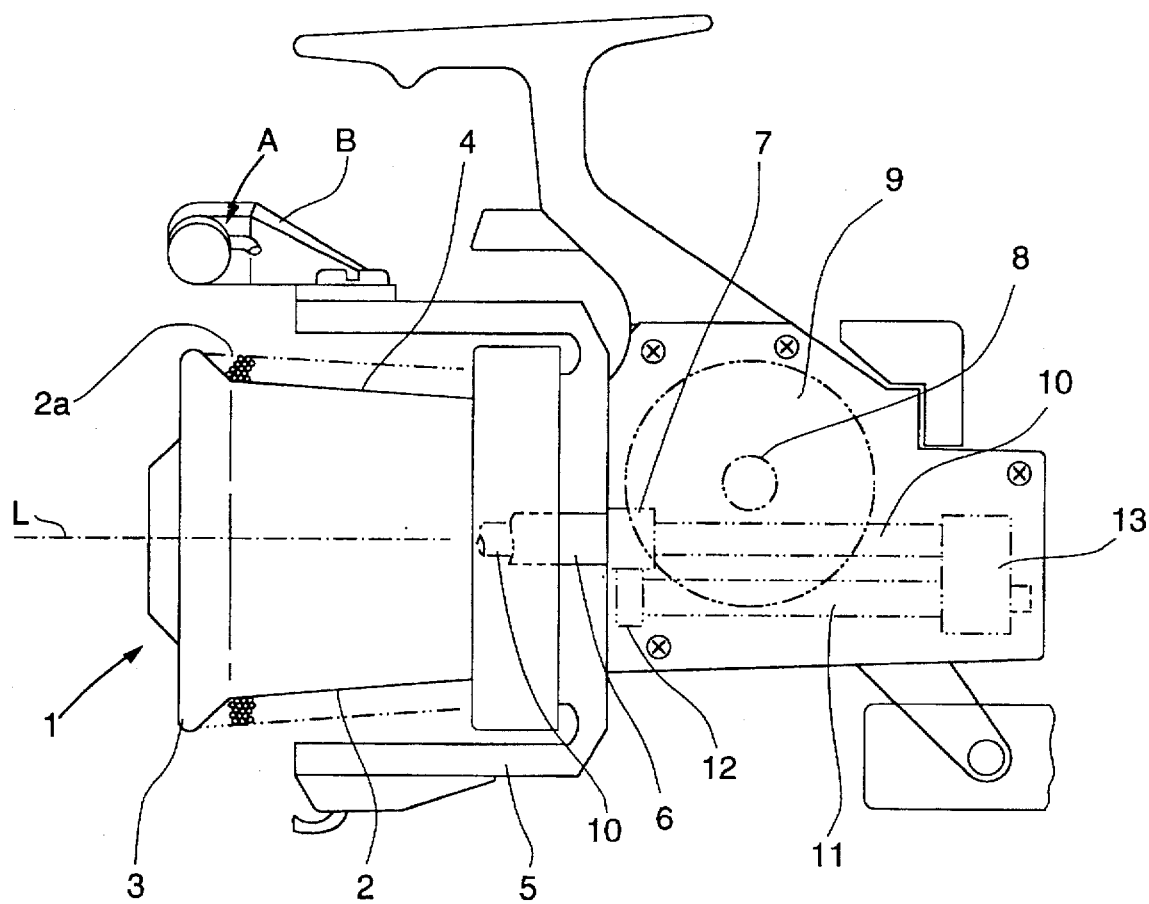
FIG. 1 is a side view showing a fishing spinning reel, which constitutes a first embodiment of the invention.

FIG. 1 is a side view showing a fishing spinning reel, which constitutes a first embodiment of the invention.

In the fishing spinning reel, as shown in FIG. 1 a rotor 5 is fixedly connected to the front end portion of a tubular shaft 6 which is rotatably supported. The rear end portion of the tubular shaft 6 is formed into a pinion 7, which is engaged with a drive gear 9 which is turned with a handle shaft 8.

A spool shaft 10, on which a spool 1 is fixedly mounted, is inserted into the tubular shaft 6. A rotary shaft 11 having a traverse cam groove is supported below the spool shaft 10 in such a manner that the former 11 is in parallel with the latter 10. A small gear 12 fixedly mounted on the front end portion of the rotary shaft 11 is engaged with the pinion 7. A block member 13 forming a conventional spool slide mechanism is fixedly secured to the rear end of the spool shaft 10, and is slidably mounted on the rotary shaft 11. Hence, as the drive gear 9 is turned, the spool shaft 10 is moved back and forth.

In the fishing spinning reel thus constructed, a conventional clutch-mechanism-operated reverse turn preventing device (not shown) is provided on the side of the tubular shaft 6. In winding the fishing line on the reel, the clutch mechanism performs, for instance, a wedge action, so that the tubular shaft 6 is allowed to turn in the line winding direction as the spool shaft 10 is moved back and forth; that is, the rotor 5 is prevented from turning in the reverse direction.

On the other hand, when the clutch mechanism takes a non-operation position, then the tubular shaft 6 is allowed to turn not only in the forward direction but also in the reverse direction. Hence, in this case, the fishing line can be thrown while the rotor 5 is being turned in the reverse direction. The line throwing operation is carried out as follows: After a bail supporting member B having a fishing line guide A is turned in the conventional manner, the fishing rod (not shown) is quickly swung down to throw the fishing line far from the fishing reel.

In the embodiment, the spool 1 is shaped as shown in FIG. 1. That is, the spool 1 has a fishing-line winding surface 2 which is the surface of a taper 4 which is gradually smaller in diameter towards the rear end, and a guide 3 at the front end which, when the fishing line is let out of the fishing reel, prevents the fishing line coming from behind the spool from touching the wound fishing-line surface 2a which is provided by the fishing line wound on the front part of the fishing-line winding surface 2. The preferable range of the taper angle of the fishing-line winding surface 2 with respect to an axis L of the spool 2 is about 0.5° to 10°. In this embodiment, the taper angle of the fishing-line winding surface 2 is set at 2.5°. In addition, since the invention is directed mainly to spools of a type that have a shallow fishing-line winding space and are used to throw the terminal hook device further away, the ratio of the maximum diameter b of the winding surface 2 relative to the maximum diameter a of the guide 3 is preferably set within 70% to 95% ($0.7 \leq b/a \leq 0.95$).

Hence, in the fishing reel of the invention, unlike the conventional one, the guide 3, which extends from a front end of the tapered fishing-line winding surface 2 forwardly with a tapered angle larger than that of the winding surface 2, eliminates the deficiencies of the conventional designs described earlier. In other words, the present embodiment solves the difficulty that, when the fishing line is let out of the fishing reel, the fishing line coming from behind the spool 1 touches the fishing line which is wound on the front part of the fishing-line winding surface 2 to provide the wound fishing-line surface 2a, thus being moved together with the latter; that is, the guide 3 is able to prevent the wound fishing line from being collapsed. In other words, the provision of the guide 3 prevents the occurrence of the trouble that the fishing line is bound together when let out of the reel; that is, the fishing line can be positively let out of the reel positively loop by loop. Thus, with the fishing reel of the invention, the line throwing operation can be achieved stably.

Figure 2:
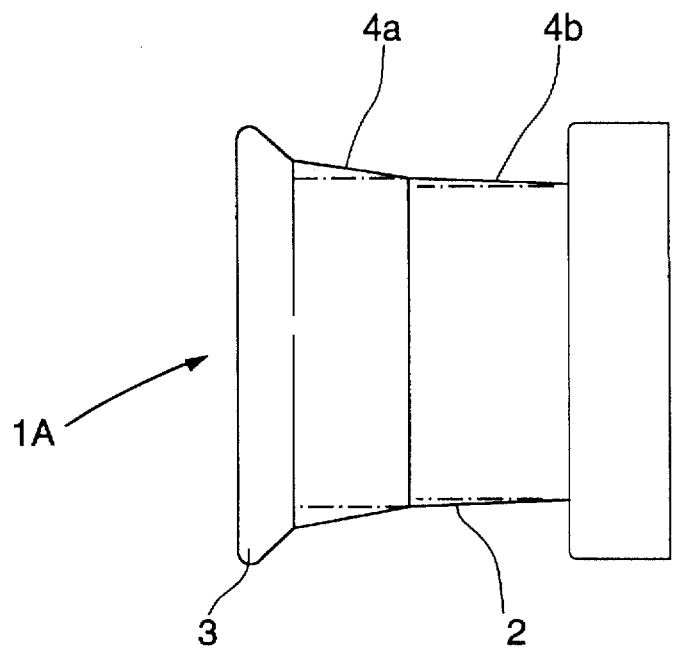
FIG. 2 is a side view of a spool in a second embodiment of the invention.

FIG. 2 is a side view of a spool in another example of the fishing spinning reel, which constitutes a second embodiment of the invention.

The spool 1A shown in FIG. 2 is a first modification of the spool 1 shown in FIG. 1. In the spool 1 shown in FIG. 1, its fishing-line winding surface is provided by only one tapered portion 4 whose generating line is substantially straight. On the other hand, the spool 1A shown in FIG. 2 is made up of two tapered portions, namely, a front tapered portion 4a and a rear tapered portion 4b which are different in cone angle from each other.

More specifically, in the modification, the front tapered portion 4a is larger in cone angle than the rear tapered portion 4b, and therefore the fishing line from the front tapered portion 4a close to the guide 3 is readily moved over the guide 3; that is, when the fishing line is let out of the reel, the frictional resistance applied thereto is less.

Figure 3:
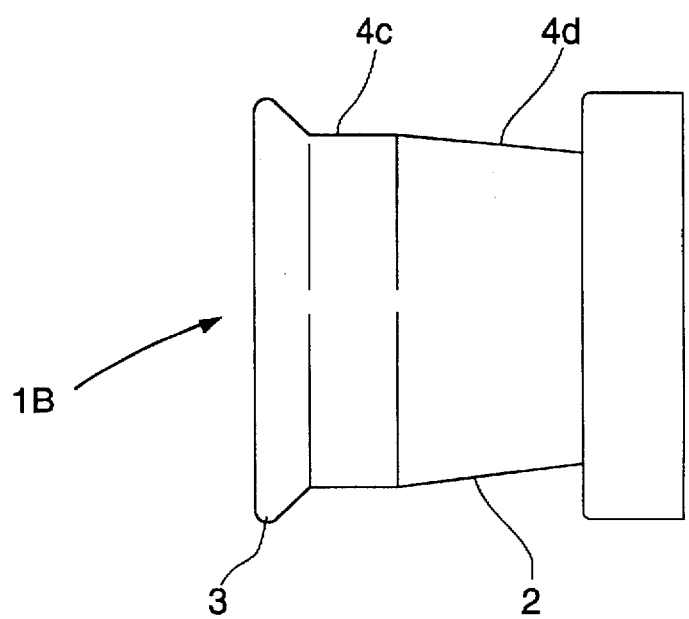
FIG. 3 is a side view of a spool in a third embodiment of the invention.

FIG. 3 is a side view of a spool in another example of the fishing spinning reel, which constitutes a third embodiment of the invention.

The spool 1B shown in FIG. 3 is a second modification of the spool 1 shown in FIG. 1. In the spool 1B, its fishing-line winding surface is provided by a rear tapered portion 4d and a front tapered portion 4c which is smaller in cone angle than the rear taper 4d. The front tapered portion 4c may be modified into a cylindrical portion which is not tapered at all.

In the second modification, the wound fishing-line surface 2a provided by the fishing line wound on the front tapered portion (or the cylindrical portion) 4c is low, and accordingly the possibility that the fishing line coming from behind the spool touches the wound fishing-line surface is decreased; that the wound fishing line is scarcely collapses.

Figure 4:
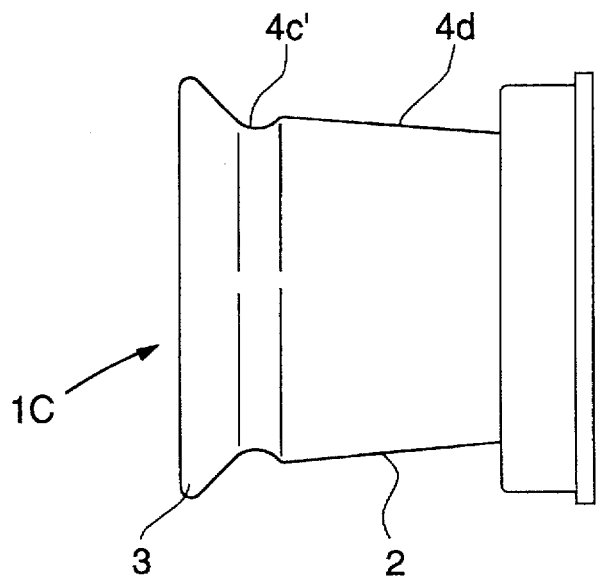
FIG. 4 is a side view of a spool in a fourth embodiment of the invention.

FIG. 4 is a side view of a spool in another example of the fishing spinning reel, which constitutes a fourth embodiment of the invention.

The spool 1C shown in FIG. 4 is a third modification of the spool 1 shown in FIG. 1. In the spool 1C, its fishing-line winding surface is provided by a rear tapered portion 4d and a front portion 4c' as similarly to the second modification shown in FIG. 3, and the front portion 4c' in this modification is formed as an annular recess to reduce the diameter of the fishing-line winding surface 2 at this portion. The front portion 4c' in the form of the annular recess can prevent the expansion of the wound fishing-line surface 2a at the front end of the spool 1, which may occur when the fishing line is wound onto the spool with the use of an oscillating mechanism for moving the spool back and forth.

Figure 5:
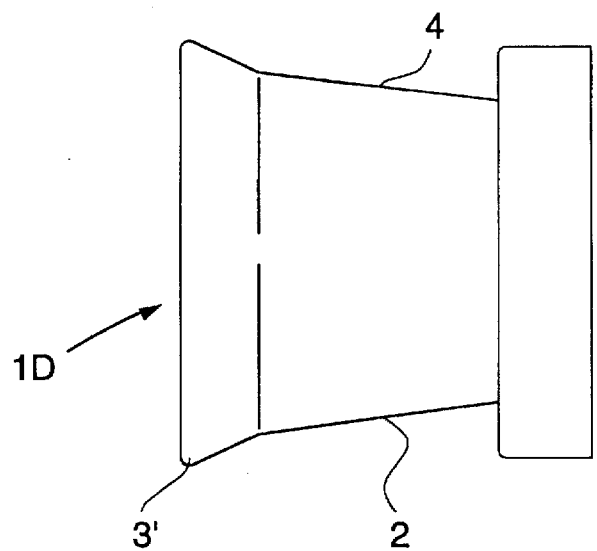
FIG. 5 is a side view of a spool in a fifth embodiment of the invention.

FIG. 5 is a side view of a spool in another example of the fishing spinning reel, which constitutes a fifth embodiment of the invention.

The spool 1D shown in FIG. 5 is a fourth modification of the spool 1 shown in FIG. 1. In the spool 1D, the taper angle (or cone angle) of the guide 3' is made gentle in comparison to the guide 3 of the spool 1 shown in FIG. 1.

Figure 6:
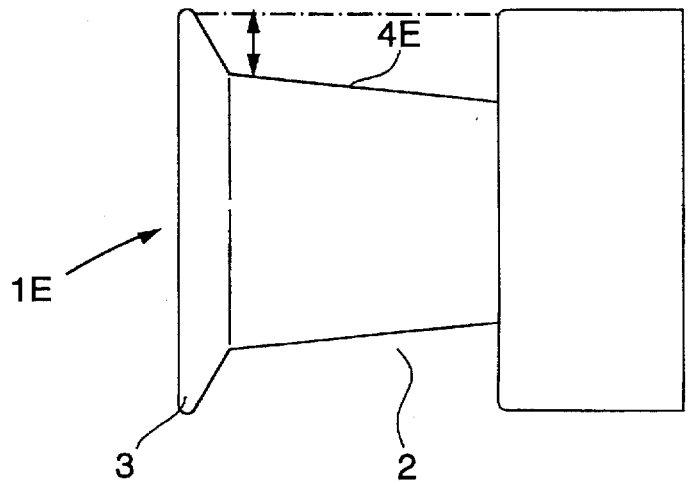
FIG. 6 is a side view of a spool in a sixth embodiment of the invention.

FIG. 6 is a side view of a spool in another example of the fishing spinning reel, which constitutes a sixth embodiment of the invention.

The spool 1E shown in FIG. 6 is a fifth modification of the spool 1 shown in FIG. 1, in which the tapered portion 4E defining the fishing-line winding surface 2 is made smaller in diameter in comparison to the tapered portion 4 of the spool 1 shown in FIG. 1 so as to provide a deeper fishing-line winding space. In addition, the skirt portion of the spool 1E in this modification is made longer in the axial length than that of the spool 1 shown in FIG. 1.

As was described above, in the fishing spinning reel of the invention, the spool comprises: the tapered portion which is gradually smaller in diameter towards the rear end, thus providing the fishing-line winding surface; and the guide at the front end which, when the fishing line is let out of the reel, prevents the fishing line from touching the wound fishing-line surface. Hence, with the spool, the fishing line wound on the fishing line winding section is prevented from collapsing and in addition it is prevented from being bound together when let out of the reel; that is, the fishing line is stably let out of the reel at all times.

What is claimed is:

1. A fishing spinning reel in which a fishing line is wound on a spool to form a wound fishing line surface, said spool being mounted to said spinning reel at a proximal end of said spool and being moved back and forth in association with the rotation of a handle, wherein said spool comprises:

a guide at a distal end of said spool for restraining the fishing line from touching the wound fishing line surface when the fishing line is let out from said reel; and a tapered portion having a fishing line winding surface that extends from a proximal end of said guide to the proximal end of said spool, said tapered portion consisting of no more than two sections, each said section having a substantially linear profile, each said section having a constant taper angle, and each said section gradually decreasing in diameter towards the proximal end of said spool.

2. A fishing spinning reel according to claim 1, wherein said tapered portion consists of first and second sections having different taper angles, respectively, with respect to a longitudinal axis of said spool.

3. A fishing spinning reel according to claim 1, wherein said guide has a diameter larger than a maximum diameter of said tapered portion.

4. A fishing spinning reel according to claim 1, wherein said guide is gradually smaller in diameter toward said tapered portion, and a taper angle of said guide with respect to a longitudinal axis of said spool is larger than a taper angle of said tapered portion.

5. A fishing spinning reel according to claim 4, wherein said wound fishing-line surface is an outermost cylindrical surface of the fishing line wound on said tapered portion and a portion of said guide.

6. A fishing spinning reel according to claim 1, wherein said tapered portion consists of a single section extending from the proximal end of said guide to the proximal end of said spool.

7. A fishing spinning reel according to claim 1, wherein a taper angle of said tapered portion with respect to a longitudinal axis of said spool is between about 0.50° and about 10°.

8. A fishing spinning reel according to claim 1, wherein a ratio of a maximum diameter of said tapered portion to a maximum diameter of said guide is between about 0.7 and about 0.95.

9. A fishing spinning reel in which a fishing line is wound on a spool to form a wound fishing line surface, said spool being moved back and forth in association with the rotation of a handle, wherein said spool comprises:

a tapered portion having a substantially linear profile, wherein the tapered portion is gradually smaller in diameter towards a proximal end of said spool mounted on said spinning reel, thus providing a fishing line winding surface;

a guide at a distal end of said spool for preventing the fishing line from touching the wound fishing line surface when the fishing line is let out from said reel; and an annular recess between said tapered portion and said guide.

* * * * *